United States Patent
Choi et al.

(10) Patent No.: US 12,547,536 B2
(45) Date of Patent: Feb. 10, 2026

(54) STORAGE DEVICE WITH MEMORY CONTROLLER AND METHODS OF OPERATION

(71) Applicant: SK hynix Inc., Icheon-si (KR)

(72) Inventors: Hyeong Jae Choi, Icheon-si (KR); Seung Soo Kim, Icheon-si (KR); Chi Je Park, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 175 days.

(21) Appl. No.: 18/493,144

(22) Filed: Oct. 24, 2023

(65) Prior Publication Data

US 2024/0403206 A1 Dec. 5, 2024

(30) Foreign Application Priority Data

Jun. 2, 2023 (KR) .................. 10-2023-0071667

(51) Int. Cl.
*G06F 12/02* (2006.01)
*G06F 12/12* (2016.01)

(52) U.S. Cl.
CPC ............ *G06F 12/023* (2013.01); *G06F 12/12* (2013.01)

(58) Field of Classification Search
CPC .............. G06F 12/0802; G06F 12/0811; G06F 12/0862; G06F 9/30141; G06F 9/30098; G06F 9/30047; G06F 9/3806; G06F 9/3838; G06F 9/3842; G06F 9/44521; G06F 2212/60; G06F 2212/72; G06F 2212/602; G06F 2212/6028
See application file for complete search history.

(56) References Cited

U.S. PATENT DOCUMENTS

| | | |
|---|---|---|
| 2017/0177469 A1 | 6/2017 | Hashimoto |
| 2019/0129750 A1* | 5/2019 | Liu .................. G06F 9/4881 |
| 2022/0035566 A1* | 2/2022 | Henze ................ G06F 3/061 |
| 2022/0159638 A1* | 5/2022 | Fong ................ H04W 72/20 |
| 2023/0127512 A1* | 4/2023 | Zhu .................. G06F 3/0625 |
| | | 711/103 |
| 2024/0129096 A1* | 4/2024 | Ahmadi ........... H04W 52/0216 |
| 2024/0281158 A1* | 8/2024 | Kim ................ G06F 3/0634 |
| 2024/0419365 A1* | 12/2024 | Sharma ............ G06F 3/0689 |

FOREIGN PATENT DOCUMENTS

| | | |
|---|---|---|
| KR | 20190069286 A | 6/2019 |
| KR | 20220059259 A | 5/2022 |

* cited by examiner

*Primary Examiner* — Tracy C Chan

(57) ABSTRACT

The present disclosure relates to a storage device capable of receiving early suspend information from an external device (e.g., host) and performing an appropriate operation during a power saving mode for an application installed on the external device, and a method of operating a memory controller of the storage device. The method of operating a memory controller may include: receiving early suspend information from an external device; and controlling a background operation according to the reception of the early suspend information. The background operation refers to an operation that is performed internally regardless of a request from the external device.

14 Claims, 5 Drawing Sheets

STORAGE DEVICE WITH MEMORY CONTROLLER AND METHODS OF OPERATION

CROSS-REFERENCE TO RELATED APPLICATIONS

The present application claims priority under 35 U.S.C. § 119 (a) to Korean Patent Application No. 10-2023-0071667, filed in the Korean Intellectual Property Office on Jun. 2, 2023, which is incorporated herein by reference in its entirety.

BACKGROUND

1. Technical Field

Various embodiments of the present disclosure relate to a storage device with a memory controller, and more particularly, to a storage device capable of performing an appropriate background operation after receiving early suspend information, and methods of operation thereof.

2. Related Art

A storage device is a device capable of storing data based on a request from an external device such as a computer, a mobile terminal (e.g., a smart phone or tablet), or various other electronic devices.

The storage device may further include a controller for controlling a memory (e.g., volatile memory or non-volatile memory). This controller receives a command from a host and can, on the basis of the received command, perform or control operations to read, write, or erase data in the memory included in the storage device.

Recently, the paradigm for computer environments is shifting to ubiquitous computing which allows a computer system to be used anytime and anywhere. As a result, mobile devices such as mobile phones, digital cameras, laptops, etc., are being rapidly and increasingly used. Such mobile devices generally utilize a memory system using a storage device, and more specifically, a data storage device. The data storage device is used as a main storage device or an auxiliary storage device in this mobile device or a portable electronic device.

When the mobile device detects suspend related to a power saving mode for the system of the device, a suspend signal is transmitted to the storage device, and the storage device performs specific operations, for example, storing a map data.

However, when the mobile device detects early suspend related to a power saving mode for an application installed on the device, early suspend information is not transmitted to the storage device.

SUMMARY

Embodiments of the present disclosure provide a storage device capable of receiving early suspend information from an external device (e.g., a host) and performing an appropriate operation during a power saving mode for an application installed on the external device, and a method of operating the storage device.

The technical problem to be overcome in this disclosure is not limited to the aforementioned technical problems. Other technical problems not explicitly mentioned can be clearly understood from those described below by a person having ordinary skill in the art.

An embodiment of the present disclosure is a method of operating a memory controller. The method includes: receiving early suspend information from an external device; and controlling a background operation according to the reception of the early suspend information. The background operation refers to an operation that is performed internally in the memory controller regardless of a request from the external device.

Another embodiment of the present disclosure is a storage device including: a memory; and a memory controller configured to receive early suspend information from an external device and to control a background operation according to the reception of the early suspend information. The background operation refers to an operation that is performed internally in the memory controller regardless of a request from the external device.

According to embodiments of the present disclosure, by receiving early suspend information, it is possible to perform an appropriate operation during a power save mode for an application installed on the external device.

DETAILED DESCRIPTION

Hereinafter, exemplary embodiments of the present disclosure will be described in further detail with reference to the accompanying drawings.

Figure 1:
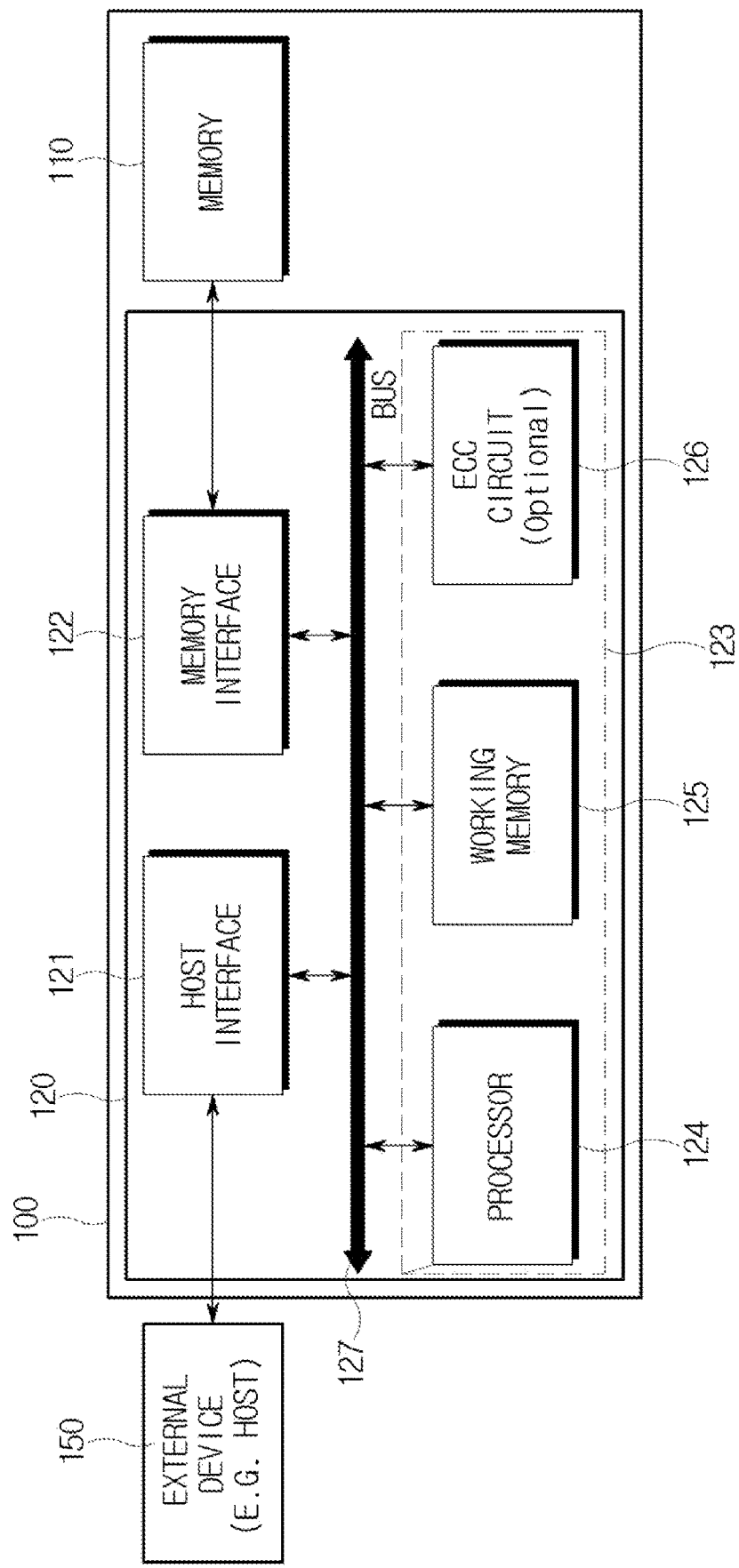
FIG. 1 is a schematic configuration diagram of a storage device according to an embodiment of the present disclosure.

FIG. 1 is a schematic configuration diagram of a storage device according to an embodiment of the present disclosure.

Referring to FIG. 1, a storage device 100 may include a memory device 110 that stores data and a controller 120 that controls the memory device 110. If necessary, additional components may be further included in the storage device 100.

The memory device 110 includes a plurality of memory blocks and operates in response to the control of the controller 120. Here, the operation of the memory device 110 may include, for example, a read operation, a program operation (also referred to as "write operation"), and an erase operation.

For example, the memory device 110 may be various types of non-volatile memories, such as a NAND flash memory, a 3D NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM) and others.

The memory device 110 may be implemented as a three-dimensional array structure. Embodiments of the present disclosure may be applied not only to a flash memory in which a charge storage layer is formed of a conductive floating gate, but also to a charge trap type flash (CTF) in which a charge storage layer is formed of an insulating film.

The memory device 110 may receive commands and addresses from the controller 120 (also referred to as a memory controller) and may access a region in memory cell arrays selected by an address. That is, the memory device 110 may perform an operation indicated by a command with respect to the region in the memory cell arrays in selected by the address.

For example, the memory device 110 may perform a program operation, a read operation, an erase operation, and others. During the program operation, the memory device 110 may program data into a region selected by an address. During the read operation, the memory device 110 may read data from a region selected by an address. During the erase operation, the memory device 110 may erase data stored in a region selected by an address.

The controller 120 may control program (write), read, erase, and background operations of the memory device 110. Here, the background operation may include one or more operations from among garbage collection (GC), wear leveling (WL), read reclaim (RR), and bad block management (BBM) operations.

The controller 120 may control the operation of the memory device 110 according to a request of an external device (e.g., a host) 150 located outside the storage device 100. On the other hand, the controller 120 may control the operation of the memory device 110 regardless of or in the absence of a request of the external device 150.

The external device 150 may also be referred to as a host, and may be a computer, a UMPC (Ultra Mobile PC), a workstation, PDA (Personal Digital Assistant), a tablet, a mobile phone, a smart phone, an e-book, a PMP (portable multimedia player), a portable game machine, a navigation device, a black box, a digital camera, a DMB (Digital Multimedia Broadcasting) player, a smart television, a digital audio recorder, a digital audio player, a digital picture recorder, a digital picture player, a digital video recorder, a digital video player, a storage constituting a data center, one of various electronic devices constituting a home network, one of various electronic devices constituting a computer network, one of various electronic devices constituting a telematics network, a radio frequency identification (RFID) device, and a mobile device (e.g., vehicle, robot, drone) that travels on the ground, water, or air under human control or autonomously.

The external device 150 may include at least one operating system (OS). The operating system may generally manage and control functions and operations of the external device 150 and provide mutual operations between the external device 150 and the storage device 100. The operating system may be divided into a general operating system and a mobile operating system according to the mobility of the external device 150.

The controller 120 and the external device 150 may be separate devices. In some cases, the controller 120 and the external device 150 may be implemented as an integrated device. Hereinafter, for convenience of description, examples in which the controller 120 and the external device 150 are separate devices will be described.

Referring to FIG. 1, the controller 120 may include a host interface 121, a memory interface 122, a control circuit 123, and others.

The host interface 121 provides an interface for communication with the external device (e.g., host) 150. For example, the host interface 121 may provide an interface that uses at least one among various interface protocols such as a Universal Serial Bus (USB) protocol, a multimedia card (MMC) protocol, a peripheral component interconnection (PCI) protocol, a PCI-express (PCI-E) protocol, an Advanced Technology Attachment (ATA) protocol, a Serial-ATA protocol, a Parallel-ATA protocol, a small computer small interface (SCSI) protocol, an enhanced small disk interface (ESDI) protocol, an Integrated Drive Electronics (IDE) protocol, a system management bus (SMBus) protocol, an inter-integrated circuit (I2C) protocol, an improved inter-integrated circuit (I3C) protocol, a proprietary protocol, and others.

The control circuit 123 may receive a command through the host interface 121 and may perform an operation of processing the received command.

The memory interface 122 may be connected to the memory device 110 to provide an interface for communication with the memory device 110. That is, the memory interface 122 may be configured to provide an interface between the memory device 110 and the controller 120 in response to a control of the control circuit 123.

The control circuit 123 may control an operation of the memory device 110 by performing overall control of the controller 120. To this end, according to embodiments of the disclosure, the control circuit 123 may include a processor 124, a working memory 125, and an optional error detection and correction circuit (ECC Circuit) 126.

The processor 124 may control all operations of the controller 120.

The processor 124 may communicate with the external device 150 through the host interface 121 and may communicate with the memory device 110 through the memory interface 122.

The processor 124 may perform a function of a flash translation layer (FTL). The processor 124 may translate a logical block address provided by the external device 150 into a physical block address through the flash translation layer (FTL). The flash translation layer may receive a logical block address and translate it into a physical block address by using a mapping table.

There are various address mapping methods that may be employed by the flash translation layer according to a mapping unit. Typical address mapping methods include a page mapping method, a block mapping method, and a hybrid mapping method.

The processor 124 may randomize data received from the external device 150. For example, the processor 124 may randomize data received from the external device 150 by using a set randomizing seed. The randomized data may be provided to the memory device 110 and programmed into the memory device 110.

The processor 124 may derandomize data received from the memory device 110 during a read operation. For example, the processor 124 may derandomize data received from the memory device 110 by using a derandomizing seed. The derandomized data may be output to the external device 150.

The processor 124 may perform background functions for the memory device 110 such as garbage collection (GC), wear leveling (WL), and bad block management (BBM).

The garbage collection may be a function to collect data partially written into an existing memory block and to move that data to another memory block in order to secure free space in the memory device 110 in order to record data when there is not enough space.

The wear-leveling may be a function to prevent excessive use of a specific block by distributing data write operations evenly across all memory blocks of the memory device 110 in order to prevent errors and data loss of the memory device 110 and to improve durability and stability of the product.

The bad block management may be a function to prevent data from being written to a bad block by detecting a bad block in the memory device 110 and replacing the bad block with a spare block when a spare block is available.

The processor 124 may control the operation of the controller 120 by executing firmware. In other words, the processor 124 may execute (drive) firmware stored in the working memory 125 during booting and thus can control overall operations of the controller 120. Hereinafter, an operation of the storage device 100 described in embodiments of the present disclosure may be implemented with the processor 124 executing the firmware in which the aforementioned operations are defined.

The firmware is a program being executed in the storage device 100 to drive the storage device 100 and may include various functional layers. For example, the firmware may include binary data in which codes for executing each of the aforementioned functional layers are defined.

For example, the firmware may include a flash translation layer that performs a translation function between a logical block address transmitted from the external device 150 to the storage device 100 and a physical block address of the memory device 110; a host interface layer (HIL) that receives and translates a command from the external device 150 through the host interface 121 and delivers it to the flash translation layer; and a flash interface layer (FIL) that delivers a command instructed by the flash translation layer to the memory device 110.

Also, the firmware may include a garbage collection function, a wear leveling function, and a bad block management function.

Such firmware, for example, may be loaded into the working memory 125 from the memory device 110 or a separate non-volatile memory (e.g., ROM, NOR Flash) located outside the memory device 110. When executing a booting operation after power is turned on, the processor 124 may first load all or part of the firmware into the working memory 125.

The processor 124 may perform logic operations defined in the firmware loaded into the working memory 125 to control the overall operations of the controller 120. The processor 124 may store, in the working memory 125, a result of performing a logic operation defined in the firmware and control the controller 120 to generate a command or signal according to the result of performing the logic operation defined in the firmware. If a portion of the firmware, in which a logical operation to be performed is defined, is not loaded into the working memory 125, then the processor 124 may generate an event (e.g., interrupt) for loading the corresponding portion of the firmware into the working memory 125.

The processor 124 may load meta data required to drive the firmware from the memory device 110. The meta data is data for managing the memory device 110 and may include management information about user data stored in the memory device 110.

The firmware may be updated while the storage device 100 is being produced or while the storage device 100 is running. The controller 120 may download new firmware from an external device located outside the storage device 100 and/or update the existing firmware to new firmware.

The working memory 125 may store firmware, program codes, commands, or pieces of data necessary to drive the memory controller 120. The working memory 125 may include at least one or more among, for example, a static random access memory (SRAM), a dynamic random access memory (DRAM), and/or a synchronous dynamic random access memory (SDRAM) as a volatile memory.

The error detection and correction circuit 126 may be configured to detect error bits of target data by using an error correction code and to correct the detected error bit(s). For example, the target data may be data stored in the working memory 125, data read from the memory device 110, or others.

The error detection and correction circuit 126 may be implemented to decode data by using the error correction code. The error detection and correction circuit 126 may be implemented using various code decoders. For example, the error detection and correction circuit 126 may be implemented with a decoder that performs nonsystematic code decoding or a decoder that performs systematic code decoding.

For example, the error detection and correction circuit 126 may detect error bit(s) with regard to each piece of read data on a sector by sector basis. That is, each piece of read data may include multiple sectors. A sector may refer to a data unit smaller than the read unit (i.e., page) of a flash memory. Sectors constituting each piece of read data may correspond to each other via an address.

The error detection and correction circuit 126 may calculate a bit error rate (BER) and determine whether or not correction can be made on a sector by sector basis. For example, if the BER is higher than a reference value, then the error detection and correction circuit 126 may determine that the corresponding sector is uncorrectable or "a fail." If the BER is lower than the reference value, then the error detection and correction circuit 126 may determine that the corresponding sector is correctable or "a pass."

The error detection and correction circuit 126 may perform error detection and correction operations successively with regard to all pieces of read data. When a sector in the read data is uncorrectable, the error detection and correction circuit 126 may omit the error detection and correction operations related to the corresponding sector in the piece of read data. After finishing error detection and correction operations with regard to all pieces of read data in this manner, the error detection and correction circuit 126 may detect a sector deemed uncorrectable at the end of the operations. There may be one or more sectors deemed uncorrectable. The error detection and correction circuit 126 may deliver information, such as address information, regarding the sectors deemed uncorrectable to the processor 124.

A bus 127 may be configured to serve as a channel connecting the components 121, 122, 124, 125, and 126 of the memory controller 120 for transmission of signals, commands, data, or others. The bus 127 may include, for example, a control bus for delivering various kinds of control signals and commands, and a data bus for delivering various kinds of data.

Some of the aforementioned components 121, 122, 124, 125, and 126 of the controller 120 may be omitted, or some of these elements may be integrated into a single component.

In addition, the memory controller 120 may also contain one or more other components in addition to the components mentioned above.

The external device (e.g., host) 150 may be a mobile device including a smartphone, a laptop computer, a wearable device, a tablet, and others. The mobile device enters a suspend state or an early suspend state, thereby efficiently saving power.

The early suspend state may be referred to as a power saving mode for applications installed on the external device 150, and the suspend state may be referred to as a power saving mode for the external device 150.

Generally, when the external device 150 enters the early suspend state, it can enter the suspend state but not necessarily. In other words, when the external device 150 enters the early suspend state, it may enter the suspend state or may not enter the suspend state. According to an embodiment, if the external device 150 is set not to enter the suspend state for each application, the external device 150 does not enter the suspend state although it enters the early suspend state for the application. In addition, according to another embodiment, if an event such as the pressing of a power button, call reception, or a notification, etc., occurs during the early suspend state, then the external device 150 may immediately become active without entering the suspend state.

In the past, an external device transmitted suspend information to a storage device but did not transmit early suspend information to the storage device. Therefore, the storage device was not able to determine the early suspend state of the external device and did not perform a special operation accordingly.

However, if the external device 150 is in the early suspend state, for example, turning off of the screen of the external device 150, etc., then a frequency at which the application accesses the storage device 100 decrease, since an access rate to the storage device 100 may not be important to a user.

Accordingly, power consumption can be further reduced if the storage device 100 performs an appropriate operation for the early suspend state.

Hereinafter, when the external device (e.g., host) 150 is a mobile device, an operation performed by the storage device 100 during the early suspend state will be described in detail.

In the embodiment, the background operation may mean an operation that is performed internally in the memory device 110 regardless of the request from the external device 150, and a foreground operation may mean an operation that is performed by the request from the external device 150.

Figure 2:
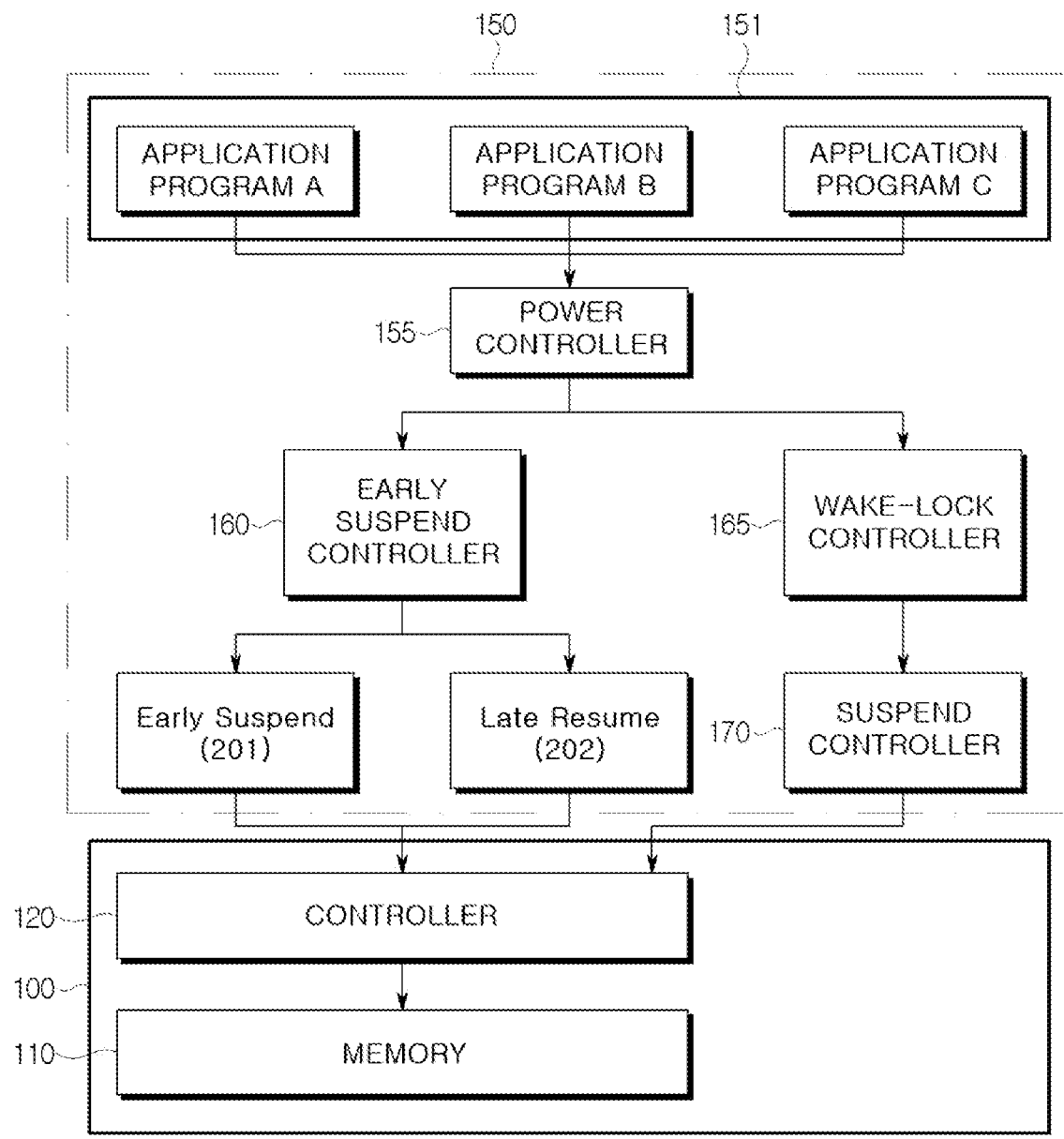
FIG. 2 is a schematic block diagram of an external device (e.g., a host) and the storage device, describing a process of processing early suspend information when the external device related to the embodiments of the present disclosure is implemented by a mobile device.

FIG. 2 is a schematic block diagram of an external device 150 (e.g., host) and the storage device 100, describing a process of processing early suspend information, when the external device 150 related to embodiments of the present disclosure is implemented by a mobile device.

As shown in FIG. 2, the external device 150 may include a power controller 155, an early suspend controller 160, a wake-lock controller 165, and a suspend controller 170.

At least one application 151 (e.g., an application program A, an application program B, and an application program C) may be driven in the external device 150. Based on the application 151 being driven, the power controller 155 may control a power level of the external device 150.

When an event, such as turning off of the screen of the external device 150, occurs, the early suspend controller 160 may generate early suspend information 201 and then may transmit it to the memory controller 120. The memory controller 120 that has received the early suspend information 201 may perform an appropriate operation during the current early suspend state.

If an event such as the pressing of a power button, call reception, or a notification, etc., occurs during the early suspend state, then the early suspend controller 160 may generate a resume signal (Late Resume) 202 and then may transmit it to the memory controller 120.

The wake-lock controller 165 may control whether or not the external device 150 enters the suspend state from the early suspend state. If the external device 150 is set not to enter the suspend state for a specific application, then the wake-lock controller 165 may control the external device 150 not to enter the suspend state.

When the external device 150 enters the suspend state by the wake-lock controller 165, the suspend controller 170 may generate suspend information and transmit it to the memory controller 120.

Figure 3:
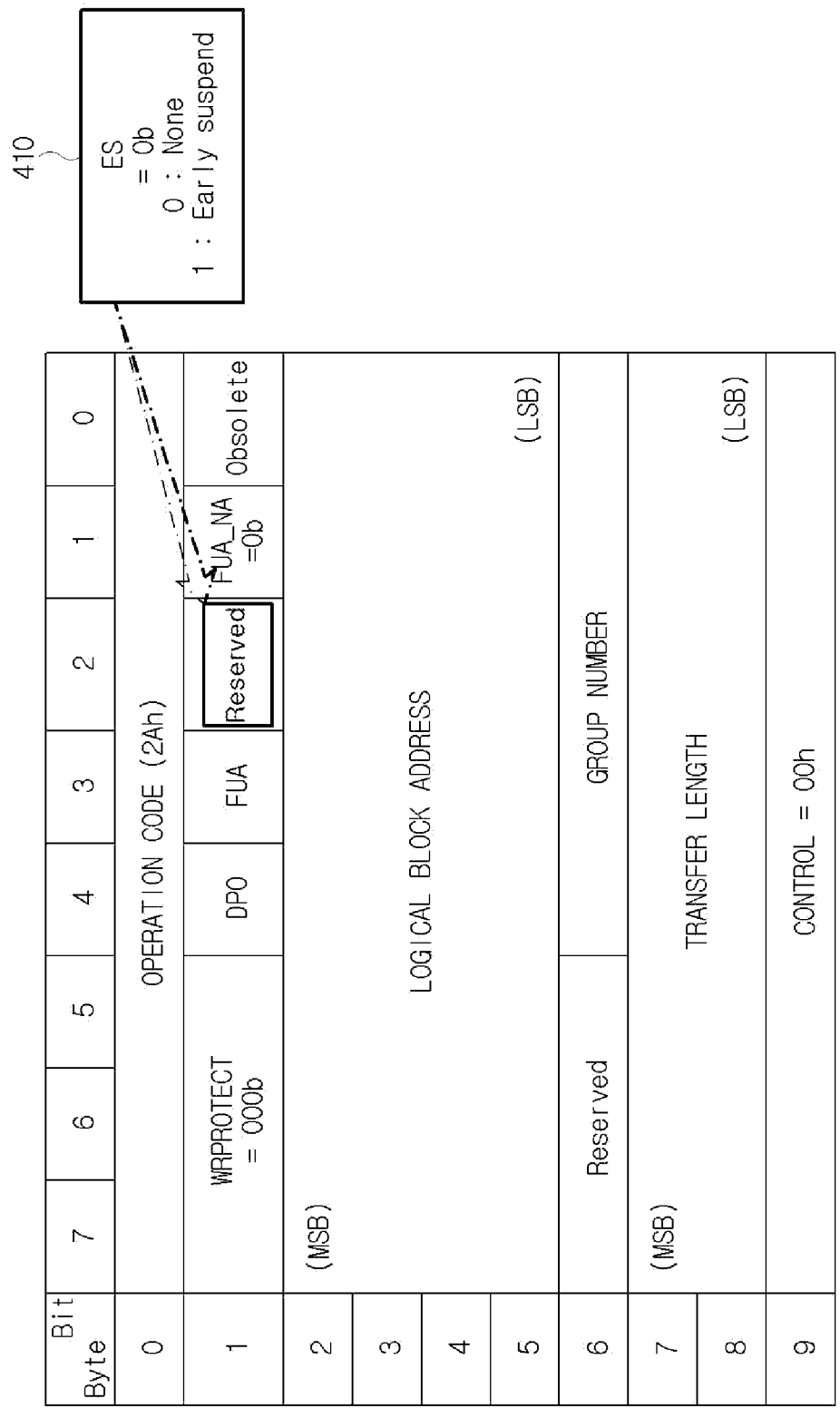
FIG. 3 is a table showing an example of a structure of a command including the early suspend information related to embodiments of the present disclosure.

FIG. 3 is a table showing an example of a structure of a command including the early suspend information related to embodiments of the present disclosure.

As shown in FIG. 3, the early suspend information is not transmitted as a separate command including only the early suspend information but may be included in another Input/Output (IO) command and be transmitted.

According to the embodiment, the early suspend information may be transmitted by using a reserved field 410 of a write command for causing the external device 150 to write data to the storage device 100. For example, in FIG. 3, the reserved field of bit 2 of byte 1 may be newly defined as an Early Suspend (ES) field for transmitting the early suspend information. Alternatively, one of the bits of the reserved field of bits 5 to 7 of byte 6 may be newly defined as an ES field for transmitting the early suspend information. In this case, when a value of the ES field is "1", this may indicate that the external device 150 is in the early suspend state, and when the value of the ES field is "0", this may indicate the external device 150 is not in the early suspend state. Although the above embodiment proposes to use the reserved field of the write command, the embodiment is not limited thereto. The embodiment can use a random reserved field included in any pre-standardized command that is transmitted from the external device 150 to the storage device 100.

In this way, when the early suspend information is included in another IO command and is transmitted to the storage device 100, an overhead of defining and generating a separate command can be reduced.

Figure 4:
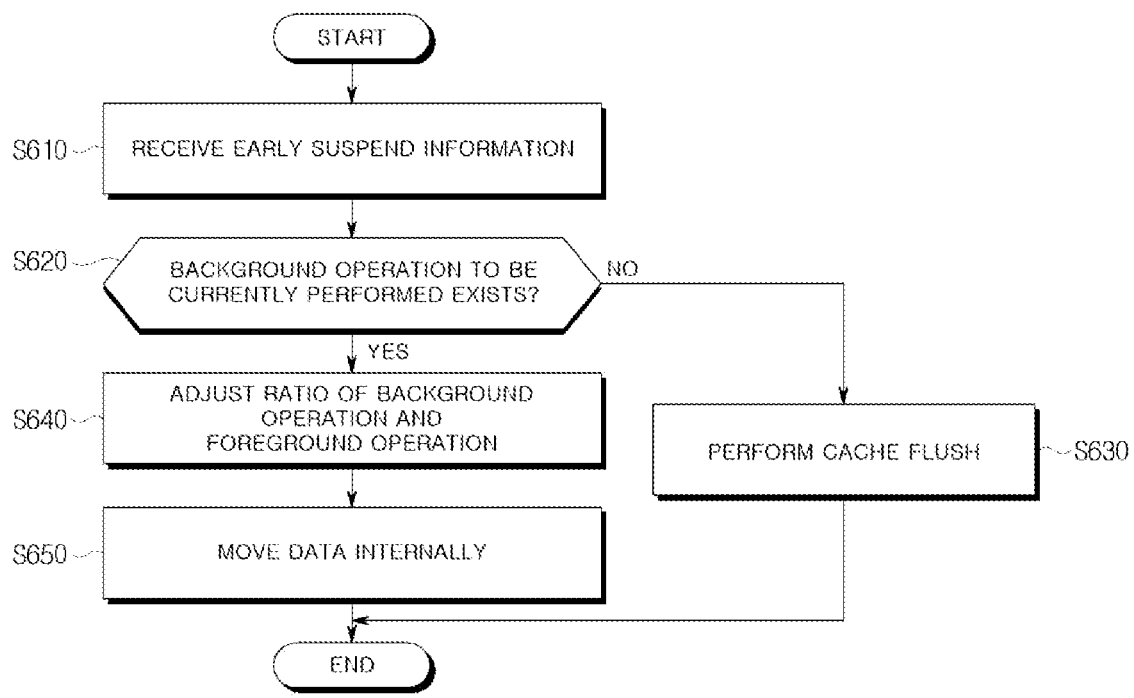
FIG. 4 is a flowchart describing a method of operating a memory controller according to early suspend information reception related to embodiments of the present disclosure.

FIG. 4 is a flowchart describing a method of operating the memory controller 120 according to early suspend information reception related to the embodiments of the present disclosure.

The memory controller 120 may receive the early suspend information (S610). After receiving the early suspend information, the memory controller 120 may determine whether the background operation to be currently performed exists (S620).

If the background operation to be currently performed does not exist, then the memory controller 120 may perform cache flush, which is a preliminary operation to enter the suspend state (S630). Here, the cache flush may refer to an operation of storing, in the memory device 110, information that is included in a cache within the memory controller 120 and is required to be stored in the memory device 110 for later use.

If the background operation to be currently performed exists, then the memory controller 120 may adjust a ratio of the current background operation to the current foreground operation in performing the operations (S640). For example, the memory controller 120 may increase a proportion that the background operation occupies and may reduce a proportion that the foreground operation occupies, so that the background operation in which the external device 150 can recognize that an access rate to the storage device 100 is reduced can be further performed.

According to another embodiment, if the background operation to be currently performed exists, then the memory controller 120 may internally move data (S650).

Figure 5:
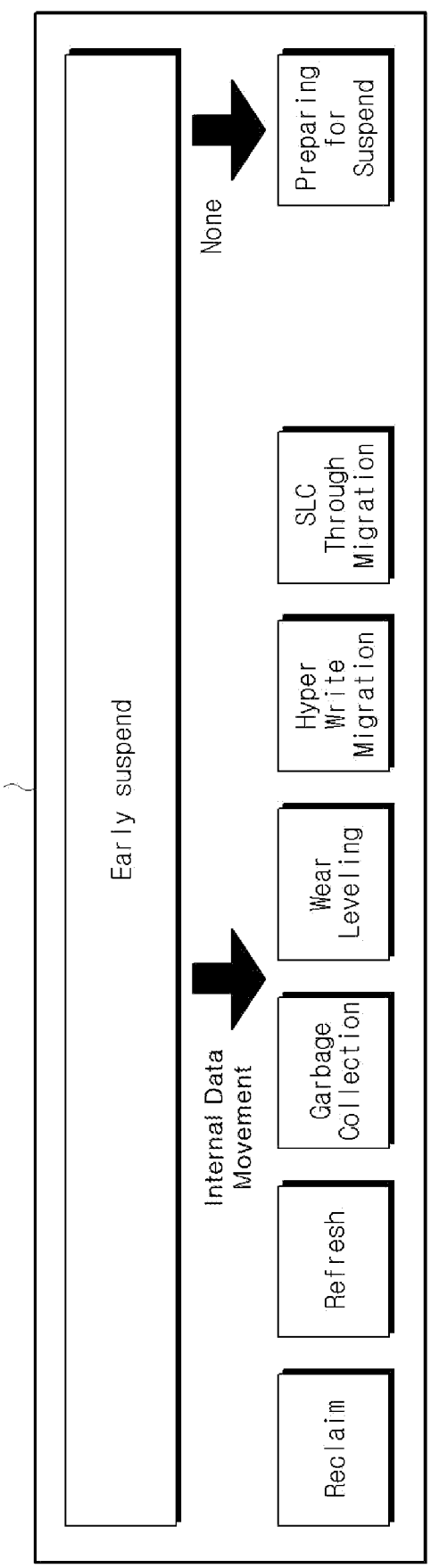
FIG. 5 is a schematic diagram describing in more detail a step S650 of FIG. 4 related to embodiments of the present disclosure.

FIG. 5 is a schematic diagram to describe in more detail a process of internally moving data according to embodiments of the present disclosure.

As shown in FIG. 5, when the background operation to be currently performed exists, the memory controller 120 may internally move data (S650).

A method for internally moving data (S650) may include at least one of reclaim, refresh, garbage collection, wear leveling, hyper write migration, and single level cell (SLC) through migration operations. A priority is determined for each of the operations for internally moving data, and thus, corresponding operations may be performed according to the priority.

For example, when the memory controller 120 writes data to the memory device 110 and uses the memory device 110 for a long time, problems are highly likely to occur in the distribution of electrons in the corresponding memory cell. Therefore, reclaim that moves a storage location of corresponding data may be determined as a first priority, refresh that moves a storage location of corresponding data may be determined as a second priority when many read operations are performed and read disturbance is apt to occur, garbage collection that collects fragmented data into a new block may be determined as a third priority, and wear leveling that distributes data such that erase cycles increase evenly across all memory cells or blocks may be determined as a fourth priority. Other priorities may be determined, such as for example hyper write migration, which is referred to as an operation of first writing the data to single level cell (SLC) for performance and of transmitting it to triple level cell (TLC), and SLC through migration, which is referred to as an operation of first writing the data to the SLC for performance and of transmitting it to quadruple level cell (QLC).

As described above, the storage device 100 and methods of operation thereof according to embodiments of the present disclosure can receive the early suspend information from the external device (e.g., host) 150 and perform an appropriate operation during a power saving mode for an application installed on the external device 150.

According to the embodiment of the present disclosure, the storage device 100 and the method of operation thereof can adjust a ratio of the current background operation to the foreground operation in accordance with the current early suspend state of the external device 150.

The foregoing is only an illustrative description of the spirit of the present invention. Various substitutions, modification and changes may be made therein without departing from the essential features of the present invention by those skilled in the art. Also, the embodiments of the present invention are not intended for limiting the spirit of the present invention but intended for describing the spirit of the present invention, and the scope of the spirit of the present invention is not limited by the embodiments. The scope of the present invention should be construed by the appended claims. All the spirits within the scope equivalent to the claims should be construed to be included in the right scope of the present invention.

What is claimed is:

1. A method of operating a memory controller, the method comprising:
   receiving early suspend information from an external device; and
   controlling a background operation according to the early suspend information, wherein the background operation is an operation that is performed internally in the memory controller regardless of a request from the external device,
   wherein the controlling the background operation comprises determining whether the background operation to be currently performed exists, and
   wherein the controlling the background operation comprises adjusting a ratio of the background operation to a foreground operation if the background operation to be currently performed exists as a result of the determination.

2. The method of claim 1, wherein the early suspend information is transmitted by using a reserved field included in a random command transmitted from the external device to the memory controller.

3. The method of claim 1, wherein the controlling the background operation further comprises performing a cache flush which moves data included in an internal cache within the memory controller to the memory device and stores the data in the memory device, if the background operation to be currently performed does not exist as a result of the determination, and
   wherein the cache flush is a preliminary operation to enter a suspend state after an early suspend state.

4. The method of claim 1, wherein the controlling the background operation further comprises moving data internally, if the background operation to be currently performed exists as a result of the determination.

5. The method of claim 4, wherein the moving data internally comprises at least one of a reclaim operation, a refresh operation, a garbage collection operation, a wear leveling operation, a hyper write migration operation, and a Single-Level Cell (SLC) through migration operation.

6. The method of claim 5, wherein, in the moving data internally, a priority is determined for each of the operations, and an order in which the operations are performed is determined based on the priority.

7. The method of claim 1,
   wherein the foreground operation is an operation performed by a request from the external device.

8. A storage device comprising:
   a memory; and
   a memory controller configured to receive early suspend information from an external device and to control a background operation according to the early suspend information,
   wherein the background operation is an operation that is performed internally in the memory controller regardless of a request from the external device,
   wherein the memory controller determines whether the background operation to be currently performed exists, and
   wherein the memory controller adjusts a ratio of the background operation to a foreground operation, which are being currently performed, according to the reception of the early suspend information.

9. The storage device of claim 8, wherein the early suspend information is transmitted by using a reserved field included in a random command transmitted from the external device to the memory controller.

10. The storage device of claim 8, wherein, if the memory controller determines that the background operation to be currently performed does not exist, then the memory controller performs a cache flush which moves data included in an internal cache within the memory controller to the memory and stores the data in the memory, and
  wherein the cache flush is a preliminary operation to enter a suspend state after an early suspend state.

11. The storage device of claim 8, wherein, if the memory controller determines that the background operation to be currently performed exists, then the memory controller performs an operation of moving data internally.

12. The storage device of claim 11, wherein the operation of moving data internally comprises at least one of a reclaim operation, a refresh operation, a garbage collection operation, a wear leveling operation, a hyper write migration operation, and a Single-Level Cell (SLC) through migration operation.

13. The storage device of claim 12, wherein, in the operation of moving data internally, a priority is determined for each of the operations, and an order in which the operations are performed is determined based on the priority.

14. The storage device of claim 8,
  wherein the foreground operation is an operation that is performed by a request from the external device.

* * * * *